US005719918A

United States Patent [19]
Serbetciouglu et al.

[11] Patent Number: 5,719,918
[45] Date of Patent: Feb. 17, 1998

[54] SHORT MESSAGE TRANSACTION HANDLING SYSTEM

[75] Inventors: Bekir Serbetciouglu, Shelton; Esref Ozulkulu, Monroe; Ilhan Bagoren, Beacon Falls, all of Conn.

[73] Assignee: NewNet, Inc., Shelton, Conn.

[21] Appl. No.: 498,993

[22] Filed: Jul. 6, 1995

[51] Int. Cl.[6] .................................................. H04M 11/00
[52] U.S. Cl. .................. 379/58; 379/91; 455/33.1; 395/200.2
[58] Field of Search ................... 379/58, 59, 60, 379/62, 91, 93, 94, 258, 268; 455/33.1; 340/825.33, 825.34; 380/18, 19, 30; 395/244, 239; 235/375, 380

[56] References Cited

U.S. PATENT DOCUMENTS

| | | | |
|---|---|---|---|
| 4,405,829 | 9/1983 | Rivest et al. | 380/30 |
| 4,408,203 | 10/1983 | Campbell | 340/825.34 |
| 4,439,636 | 3/1984 | Newkirk et al. | 379/91 |
| 4,796,292 | 1/1989 | Thomas | 379/91 |
| 4,797,920 | 1/1989 | Stein | 380/24 |
| 5,136,585 | 8/1992 | Nizamuddin et al. | 370/271 |
| 5,177,342 | 1/1993 | Adams | 235/379 |
| 5,204,861 | 4/1993 | Wiebe | 370/524 |
| 5,255,182 | 10/1993 | Adams | 395/217 |
| 5,351,235 | 9/1994 | Lahtinen | 370/259 |
| 5,353,328 | 10/1994 | Jokimies | 379/58 |
| 5,357,563 | 10/1994 | Hamilton et al. | 379/91 |
| 5,396,543 | 3/1995 | Beeson, Jr. et al. | 379/59 |
| 5,490,251 | 2/1996 | Clark et al. | 379/91 |
| 5,500,890 | 3/1996 | Rogge et al. | 379/91 |
| 5,577,102 | 11/1996 | Koivunen | 379/59 |

*Primary Examiner*—Dwayne Bost
*Assistant Examiner*—Tracy M. Legree
*Attorney, Agent, or Firm*—David P. Gordon

[57] ABSTRACT

A transaction handling system (THS) for use in a cellular telephone network using Short Messages is described. The THS comprises means for receiving digitally encoded information from one or more sources, such as magnetically encoded credit card information related to credit cards, smart cards, bar codes etc. Means are provided for interpreting the digitally encoded information into a message compatible with a particular database relevant in the transaction and formulating a query to the database. The query is routed to the database. Upon receiving a reply from the database, the reply is interpreted in the THS for compatibility with the cellular network and the structure of the Short Messages within it, and routed to a terminal having a display, printer or other input/output means.

40 Claims, 14 Drawing Sheets

MESSAGE STRUCTURE BETWEEN THS AND POS
(AT SMSC TO THS INTERFACE. TCAP TYPE)

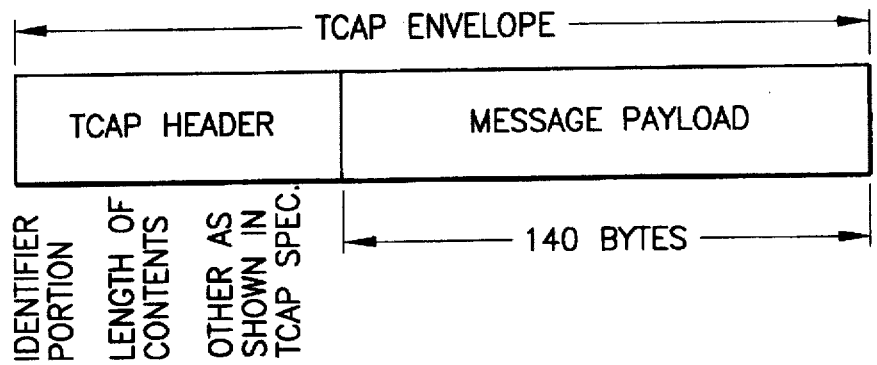

MESSAGE PAYLOAD

MSG LENGTH

MSG CORRELATOR         ROUTING FIELDS

MSG CONTEXT

APPLICATION IDENTIFIER

MSG TYPE               APPLICATION FIELDS

CURRENCY TYPE

CURRENCY AMOUNT

ACCOUNT NUMBER

BANK IDENTIFIER

ACCEPT/DECLINE

METER TYPE

METER UNITS

METER READING VALUE

BAR CODE TYPE

BAR CODE READER VALUE

LOCATION DATA (LAT/LONG/ELEV)

ADDITIONAL DATA (PUBLIC KEY. ENCR/DECR)

EXCEPTION REQUEST(HEALTH CHECK-THS STATUS)

FIG.7A

MESSAGE STRUCTURE BETWEEN THS AND APPLICATION

X. 25 MESSAGE

| PACKET HEADER | PACKET CONTENT |

PACKET HEADER — IN ACCORDANCE WITH X. 25 SPECIFICATION

PACKET CONTENT — IN ACCORDANCE WITH DATA BASE REQUIREMENTS AS GENERALLY SPECIFIED BY

VISA™

MASTER CARD™

AMERICAN-EXPRESS™ AND / OR

OTHERS

SHORT MESSAGE TRANSACTION HANDLING SYSTEM

FIELD OF INVENTION

This invention relates to the field of cellular telephony, specifically using Short Messages (SM) to access databases.

BACKGROUND OF THE INVENTION

Various standards define the global telephone system currently operating to define the exchange of data, voice and signaling messages. For example, a well known standard, such as Signaling System #7 written by Committee Centrale Internationale Telephone and Telegraphique (CCITT, SS #7), renamed as International Telecommunication Union (ITU), specifies a protocol defining how signaling messages are to be interchanged on a world wide basis among telecommunication systems.

An adjunct to these standards, the *Global System for Mobile Communications Cellular Standard* (GSM 03.4) authored by European Telephone Standards Institute (ETSI), and Interim Standard 41 (IS-41) authored by the Electronics Industry Association (EIA) and Telecommunication Industry Association (TIA) for the Cellular Telecommunications Industry Association (CTIA) defines how communications are to be conducted over wireless (air) connections for voice and signaling.

A part of the CCITT SS #7 standard defines *Transaction Capability Application Part* (TCAP). This Part, defines the protocol used to send and receive inquiries and associated responses for real time telecommunication applications over land (wire) lines or satellite systems. TCAP is used to implement Short Messaging service. Some of the Short Messaging features are defined for the air interface, for example, by GSM, IS-41, IS-54 in conjunction with TCAP. These cellular standards generally define the transfer of user specified "short" text messages between wireless terminals (cellular telephones) equipped for this purpose. The Short Messaging service can typically be used for such applications as exchanging "short" text messages between terminal equipment.

A "short" text message interchange between a mobile terminal and a typical cell transmitter/receiver is conducted on a signaling channel, over the air interface, as specified by, for example, GSM, IS-41, IS-54 and other standards. These signaling related messages are specified to be transmitted on a frequency band generally separate from the band used for voice transmission. Therefore, signaling related messages typically do not occupy the same frequencies allocated for voice transmission, unless additional message carrying capacity is required. The transaction capability of signaling messages allows messages of about 140 characters to be exchanged between wireless terminals. Generally, at low to moderate traffic levels, the 140 character messages can be sent without using the frequencies allocated for, or interfering with, voice transmissions on the same wireless terminals. With increased traffic levels, some of the voice allocated transmission capacity may be used for signaling messages.

Furthermore, a Short Message System, generally referred to as a Short Message Service Center (SMSC), specifies that a full, two way, voice channel connection need not be established between wireless entities for the exchange of signaling messages. That is, the signaling messages are generally exchanged via a SMSC and a (cellular) mobile terminal automatically upon occurrence of a specific event, such as the presence or entry of a cellular terminal within a cell. This exchange is completed without establishing a full time, two way interconnection, where a two way channel is opened and reserved. There is generally enough capacity for Short Messages (SM) in a signaling network to be used for new applications.

In general, the CCITT (ITU), GSM, IS 41, IS 54 and other specifications descriptive of a typical SMSC define generally only the methods and procedures required by the telephone network to transfer a Short Message (SM) between terminals and does not discuss any functions beyond those required for telephone operation. A cellular mobile telecommunication switching system is discussed in U.S. Pat. No. 5,396,543. A use of Short Messages has been described in general in U.S. Pat. No. 5,351,235. An adapter for use with Short Messages is described in U.S. Pat. No. 5,353,328. Certain encryption methods and apparatus applicable to this invention are also discussed in U.S. Pat. No. 4,405,829 describing a public key type (RSA algorithm) encryption, U.S. Pat. No. 3,962,539 describing, in general, DES block encryption, and U.S. Pat. No. 5,214,703 describing, in general the IDEA algorithm, another block type encryption algorithm. U.S. Pat. No. 4,797,9213 and 4,408,203 assigned to Mastercard International describe an electronic funds transfer system, and a security system for funds transfer using encryption techniques, respectively. U.S. Pat. No. 5,255,182 and 5,177,342 assigned to Visa International Service Association describe a system for determining the level of quality of transactions conducted from a point of sale terminal. U.S. Pat. No. 4,796,292 assigned to American Express Company describes a credit card authorization network and references the Visa protocol for dial-up credit card transactions. Above recited patents, GSM, CCITT (ITU), Interim Standards 41 and 54, EIA/TIA, and CTIA specifications discussed above are incorporated herein by reference in their entirety.

Certain problems are to be found in present cellular systems for the transmission of financial information. For example, insufficient security over the air interface. This facilitates the unauthorized capture of all or, for example, the financial portion of the message transmitted in a cellular environment.

Another problem is the fraudulent simulation of legitimate terminals. Here, a terminal identifier of a legitimate terminal is used by an unauthorized terminal to avoid service billing and/or to capture information for the legitimate terminal.

Yet another problem is the time lag between a query from a terminal and the response required to complete a typical transaction. Typically, a terminal has to establish a two way communication channel to transmit the query data to a data base, such as those associated with, for example, Mastercard (registered trademark of Mastercard International), Visa (registered trademark of Visa International Service Association) or American Express (registered trademark of American Express Company) credit cards. Such a transaction with a database requires various routing and administrative functions for transaction completion, adding to the time lag. The commercial feasibility of a transaction may be determined by the time lag for a response. Short time lags are preferred.

A related problem is the general inefficiency of a Point of Sale (POS) terminal in accessing a plurality of applications located at separate locations and/or accessing separate databases. Generally, a terminal is either dedicated or configured to operate with a Visa or Mastercard database, but not, for example American Express or a dispatching type application.

Therefore, it is an object of the invention to provide a method and apparatus using the existing Short Message signaling mechanisms of a cellular telephone network to exchange information between a plurality of POS terminals, destinations or sources (databases) in a secure environment, while detecting certain unauthorized uses using a common transaction handling system.

Another object of the invention is to provide a method and apparatus to respond to a query from a terminal in a timely fashion.

SUMMARY OF THE INVENTION

This invention applies in a cellular telephone network having one or more signaling channels, wherein said signaling channels carry Short Messages. The network generally comprises a plurality of terminal means for transmitting and receiving messages on said signaling channels, switching means for supporting Short Messages, and interface means for exchanging said Short Messages between said terminal means. An improved transaction handling system operates with this network and comprises means for receiving digitally encoded information from one or more sources, such as magnetically encoded credit card information, bar codes etc. Also, means for generating a unique identifier for said digitally encoded information is provided. In addition, means for converting said digitally encoded information and said identifier into a message compatible with said terminal means for transmission of said message on said telephone network using said Short Messages, said terminal means having an originating address is included.

Furthermore, means for extracting said digitally encoded information and said identifier from said message are provided, as well as means for interpreting said digitally encoded information to form a query for a destination database, said destination database external to said cellular telephone network, such as, for example, databases associated with Visa, Mastercard and/or American Express.

Means are provided for associating said unique identifier with said query of said databases along with means for routing, or directing, said query to said destination database(s).

Further means are provided for receiving a database query result from said destination database generally external to said cellular telephone network, in response to the originally sent query, along with means for transforming and interpreting said query result to generate a Short Message having a structure compatible with a cellular network. The Short Message is addressed via the cellular network to a POS having an input/output device, a printer, or a display, part of said cellular network. Means for associating contents of said query results with said unique identifier, and said originating address of a destination within said cellular network is also provided to facilitate the return of the query response to the original requester of the information contained within the query response.

To send the response to the original requester, means for embedding said message into a form compatible with said terminal means for transmission of said message on said telephone network to said originating address using said Short Messages is also provided.

The improved transaction handling system (THS) also comprises a means for encrypting said digitally encoded information before it is formed into a short message for transmission on the network, and means for decrypting said digitally encoded information at the THS. Encryption is also provided for messages originating at the THS for a POS, and decryption at the the destination POS of the message generated by the THS.

The improved transaction handling system also comprises a means for internal fraud detection.

Other objects and advantages of the subject invention will become apparent to one skilled in the art from consideration of the detailed description set forth below and of the attached drawings.

BRIEF DESCRIPTION OF THE DRAWINGS

An embodiment of the present invention will be described hereinafter, with references to the accompanying drawings, in which:

FIG. 7A is a diagram of the structure of a TCAP message initiated by a message interchange transmitted between THS 312 shown in FIG. 3 and a POS terminal unit, shown in FIG. 10.

DETAILED DESCRIPTION OF THE PREFERRED EMBODIMENTS

Figure 1:
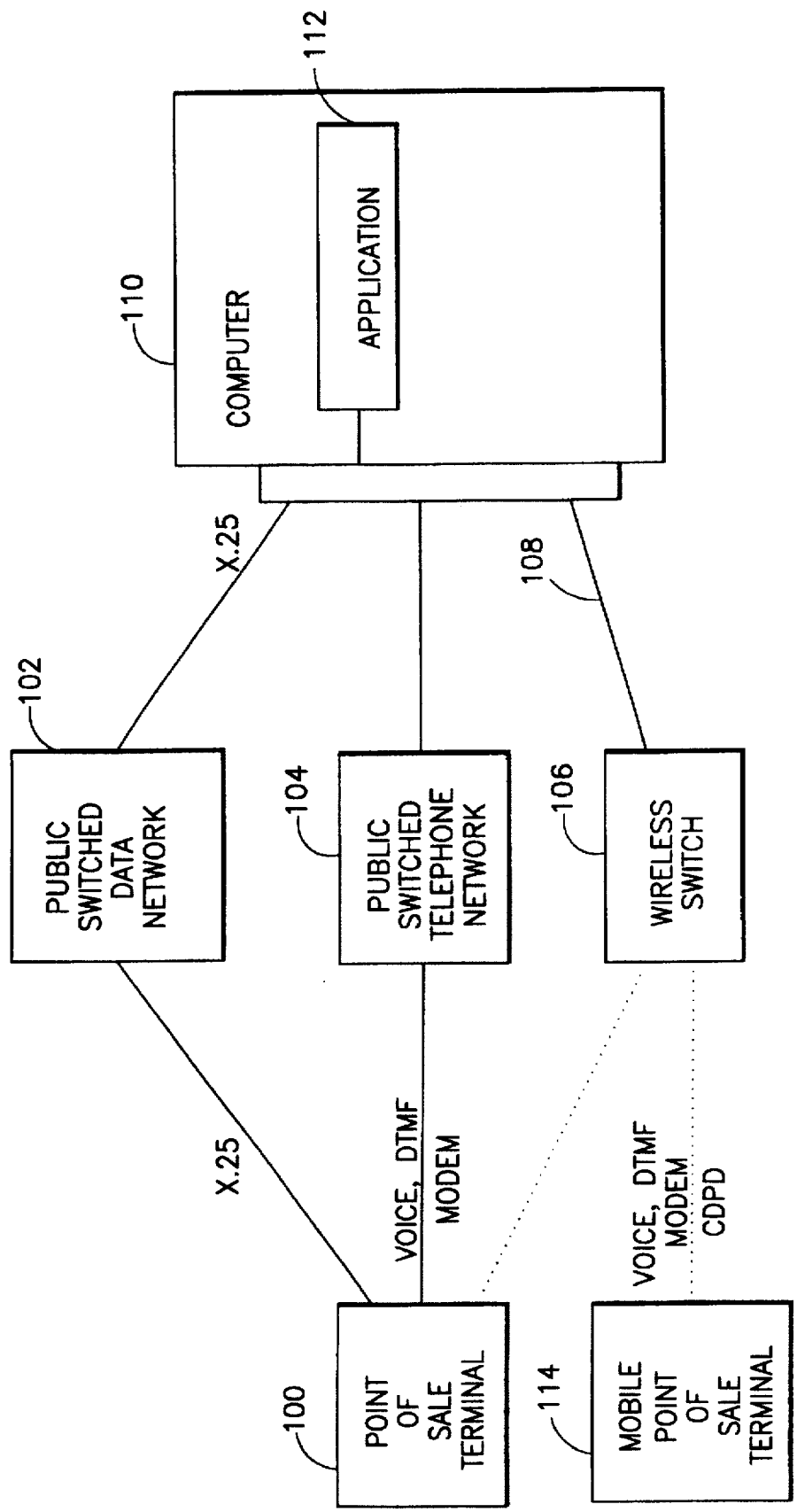
FIG. 1 is a block diagram of Point of Sale (POS) terminal unit used in a telephone network of the prior art.

As shown in FIG. 1, a depiction of the prior art, a stationary Point of Sale Terminal (POS) Unit 100 has generally three ways of reaching a (software) application 112 running within a computer 110. A first way for POS 100 to connect to application 112 is to use a public switched telephone network (PSTN) 104 to establish a full, two way "voice" connection to interface 108, and transmit data via well known Dual Tone Multi Frequency (DTMF) pulses or a modulator-demodulator (MODEM) signals. Second, POS 100 can use a wireless, or cellular, connection to wireless switch 106 to establish a full, two way, wireless connection and transmit relevant data using DTMF or MODEM signals to application 112 through interface 108. A third possibility, for cases where large amounts of data have to be exchanged between terminal 100 and application 112, is to use a CCITT specified X.25 interface to the Public Switched Data Network (PSDN) 102 to establish a full, two way data connection, from there through an X.25 or TCAP/SS7 like connection to an interface 108 to computer 110 and application 112. In general, in the prior art, POS 100 will have established a full two way connection in order to deliver transaction information to application 112 running on computer 110.

Mobile POS 114, however, is generally limited to transmit data via voice or DTMF/MODEM signals, or the Cellular Digital Packet Data standard (CPDP) through switch 106 to application 112. Again, mobile POS 114 will generally have established a full two way connection in order to deliver transaction information to application 112 running on computer 110.

A typical digital based telephone network, containing, for example, a digital switch such as American Telephone and Telegraph's #5 ESS, part of PSTN 104 as shown in FIG. 1, has three broadly classified types of messages switched within it: "data", "voice" and "signaling" types. The voice messages contain analog samples digitized from a generally analog, continuous waveform source. Data messages, in contrast to voice messages, generally contain compressed numerical information, expressed in digital form. Signaling messages, in contrast to "data" and "voice" messages, are generally used for facilitating the start-up, maintenance, and completion of a connection between a terminal to another terminal or a telephone switch. Signaling messages are generally transmitted to aid the establishment of a full two way connection.

Figure 2:
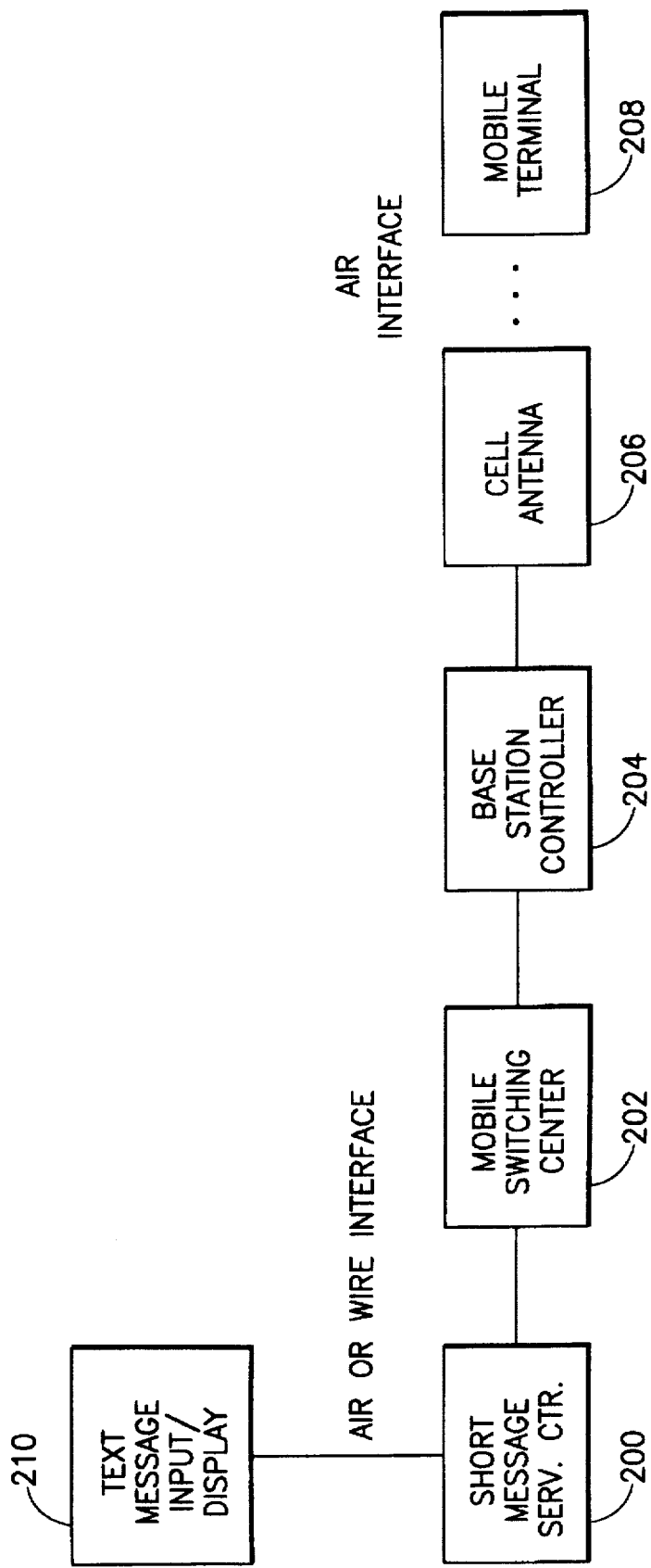
FIG. 2 is a block diagram of a typical Short Message Service Center (SMSC) within a telephone network of the prior art.

The signaling messages, generally operating on signaling channels, are used in the prior art by a Short Message Service Center (SMSC) to transmit text messages, as shown in FIG. 2. Typically, a text message is input from terminal 210 via an air or wire interface to a SMSC 200, where the message is formatted to be part of a data packet, such as, for example, TCAP. The message is switched by a Mobile Switching Center 202 to a Base Station Controller 204, which in turn passes the message to be sent via cell antenna 206 and the air interface to a Mobile Terminal 208. Conversely, Mobile Terminal 208 may reply to the text message from 210 with another text message, by initiating its own text message. This text message from Mobile Terminal 208 then follows an inverse path to terminal 210.
Interface method 1

Figure 3:
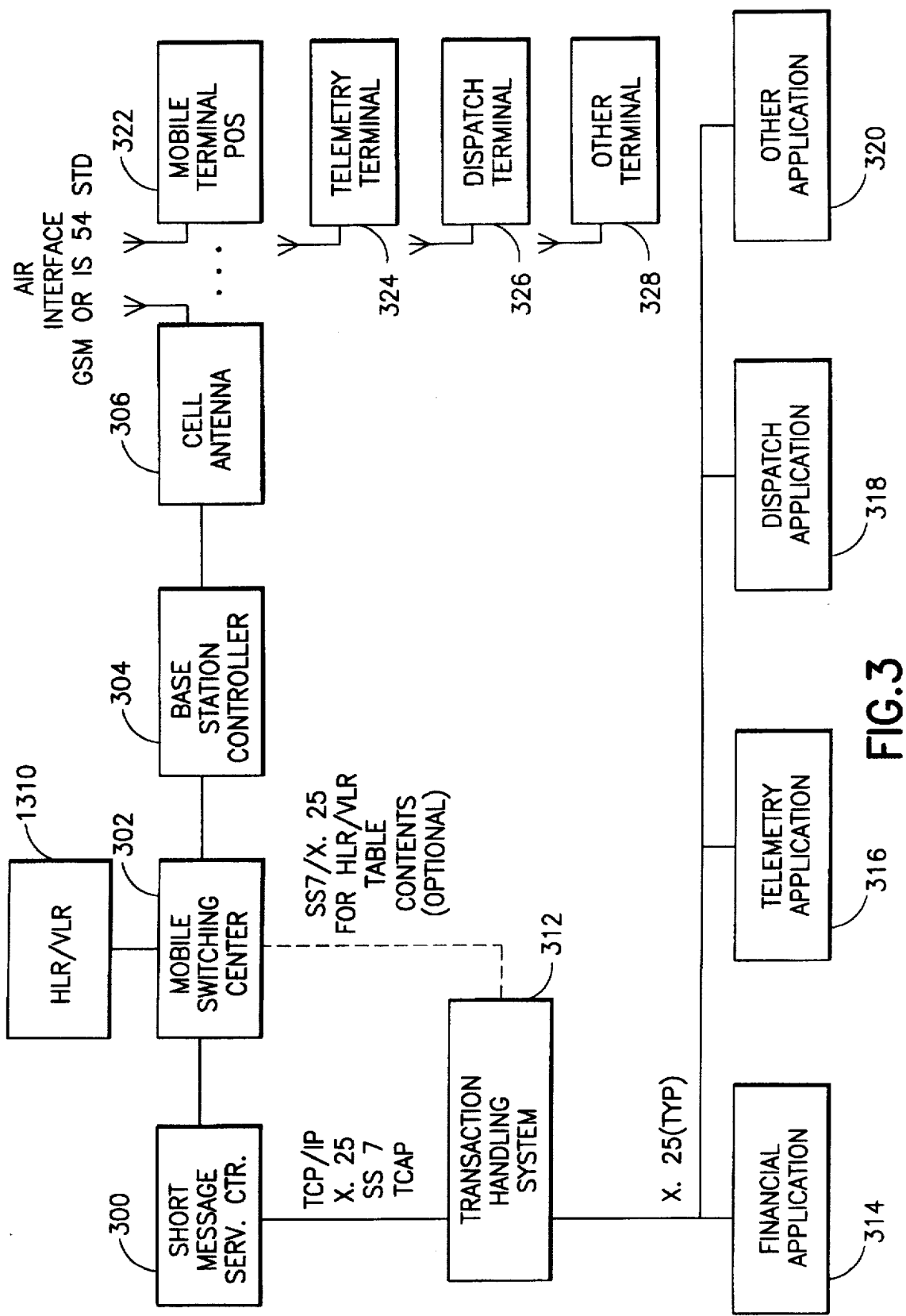
FIG. 3 is a diagram of a Transaction Handling System (THS) of the present invention interfaced via a hard wire connection to an existing SMSC.

In the present invention, as shown in FIG. 3, a Transaction Handling System (THS) 312 is provided for operation in conjunction with a plurality of terminals, each performing a different function, such as mobile terminal (POS) 322, telemetry terminal 324, dispatch terminal 326, and "other" terminal 328. The THS is used with a Short Message Service Center (SMSC) 300 part of a cellular telephone network. THS 312 interfaces to an existing SMSC 300 generally via a wire interface, or via wireless means. A typical wire interface is implemented, for example, via the TCP/IP protocol. Another method to interface SMSC 300 to THS 312 is to use the X.25 protocol well known in Public Switched Data Network applications. Yet another protocol for interfacing SMSC 300 to THS 312 is via a SS #7 or TCAP standard message transfer. THS 312 can be physically separate or can be collocated with SMSC 300 within the same computer, or network switching apparatus.

SMSC 300 is also connected to Mobile Switching Center (MSC) 302. MSC 300 contains home location register (HLR) and visitor location register (VLR) 1310 which identify the presence of cellular users in the network, as is well known in the art. HLR./VLR 1310 can be accessed by THS 312 via an optional, direct link to MSC 302, using either SS#7 or X.25 messages. This path to MSC 302 is optional because it is required only for a high reliability service level, complementary to the function of the other parts of the system.

THS 312 is also interfaced to one or more external financial applications, or databases, for example financial application 314. Financial application 314 resides in a computer generally remote from THS 312, or may be collocated with it, and the interface means to application 314 is generally by land (wire) line. An example of a financial application 314 is the database associated with a credit card operation such as Visa, Mastercharge or American Express. Another example of a financial application is a bank card, debit card, or a "smart" card linked database(s). Here, data is generally exchanged between a sending entity, i.e. the bank card, debit card or smart card and the application containing for example, databases, tables, and the like, updated to reflect the status, or balance, in an account.

Mobile terminal (POS) 322 has the ability to initiate a transaction via the air interface to SMSC 300 using the short message capability of the network. SMSC 300, in turn, passes the data associated with the transaction to THS 312. THS 312 operates upon the data from mobile terminal (POS) 322 and accesses, for example, one or more applications, such as financial application 314. The operation performed by THS 312 in response to data received from mobile terminal (POS) 322 will be described later in this application.

Yet another way to use POS 322 is to integrate its functions with that of an automatic teller machine (ATM). In this case, an application such as financial application 314 would be accessed by POS 322. The output from POS 322 would interface with the parts of the ATM required to dispense cash or complete other ATM related transactions.

THS 312 is also interfaced to one or more external telemetry applications, for example, telemetry application 316. An example of such an application 316 is the reporting and interpretation of watt-hour meter readings from telemetry terminal 324. Readings from terminal 324 are reported on a regular basis, or when specifically requested, to THS 312, where the link to THS 312 is via an air interface as defined, for example, by GSM, IS.41, IS 54 or other wireless/cellular standards prevalent in a particular country. From THS 312, the information reported by terminal 324 is analyzed. This analysis contains steps that allow the determination of, for example, unaccounted power loss between a plurality of terminals such as 324 located on power loads fed by a common power circuit. The results of this analysis are reformatted for compatibility with the requirements of telemetry application 316 by THS 312 and transmitted to application 316. A similar analysis can be performed with gas and/or water meters equipped with means similar to terminal 324 capable of digitizing and converting for transmission via an air interface consumption of various metered utilities.

THS 312 is also interfaced to one or more external dispatch applications, for example, dispatch application 318. Dispatch terminal 326 communicates with THS 312, which in turn, manages the information from and to terminal 326 to facilitate control from dispatch application running on a computer or a logical location separate from THS 312. An example of a dispatch application is a dispatch terminal 326 for controlling the movement of police vehicles and staff, using a police dispatching terminal optimized for this purpose. The dispatching is optimized due to the speed, privacy and relative security of the Short Message based transmission means coupled to the encryption/decryption capability of a dispatching terminal, such as terminal 324. This optimization should be contrasted with plain voice communications over interference prone radio frequencies with lack of privacy.

Another example of a dispatching application using terminal 326 is a fire truck dispatching terminal. With the fire location information displayed by such a terminal, a large number of fire fighting trucks can be located at many strategically located areas and be timely allocated or redistributed to fires as they arise in a large metropolitan area. In effect, the fire truck dispatching terminal provides a link for the logistical control of fire fighting resources.

Yet another example of the use of a dispatching application 318 interfacing through THS 312 to a terminal 326 is for medical emergency vehicle dispatching. The terminal 326 is used to communicate with a hospital as to the status of a patient currently en route to a hospital. Another use of such a terminal is to station medical emergency vehicle(s) in the proximity of large population concentrations, and inform the driver of the medical emergency vehicle(s) via dispatching terminal 326 of the exact location of an accident or event requiring medical assistance.

Yet another example of a dispatching application is for immediate notification of an emergency. In this case, a user wearing an appropriately miniaturized terminal, such as terminal 326, activates one or more emergency buttons whenever an emergency medical condition arises, or other emergency conditions warrant. These buttons, each having a pre-programmed function, such as, for example, medical emergency, intruder alert, fire, etc., part of terminal 326, initiates the sending of an emergency code to THS 312, using Short Messages, along with the identification of the terminal where the emergency code originated from. The emergency code, pre-programmed in the terminal, and terminal identification, is interpreted in THS 312. The interpretation, stating the name of the user, known user address, and the existence of the particular emergency, is sent to appropriate medical, law enforcement, or fire fighting personnel for immediate response. In addition, a GPS can be provided as part of terminal 326 for those users who are likely to have emergencies at unknown locations. In this case, the GPS system will provide location coordinates to THS 312 along with the emergency code signal. In the case of a medical emergency, for example, the interpreted message by THS 312 will inform medical personnel of:

a) the existence of the medical emergency,
b) patient identification,
c) patient location in latitude, longitude and elevation, as well as the nearest street address present in THS 312 database corresponding to said latitude,longitude and elevation data, and
d) the most likely cause of the medical emergency as projected from the latest medical records and existing diagnoses on file.

Yet another example of using dispatch application 318 in conjunction with THS 312 and terminal 326 is dispatch of a package delivery/pickup vehicle. The terminal is used for indicating to the driver in real time where to make the next stop, to either pick up or deliver packages, and also what route to follow to arrive at the next stop. The directions to a destination are sent in real time, as needed. The communication is more private and secure and no requirement exists for establishing concurrent two way communication. In this example, a Ground Positioning System (GPS), capable of identifying the position of the vehicle, as is well known in the art, is interfaced to terminal 326 for automatic position reporting. This further facilitates the identification of the position of the vehicle and simplifies the generation of directions to the next destination. The position of the vehicle can also be updated from accelerometers whose motion information is integrated with the GPS readings for improved position reporting.

In a typical dispatch operation, the control provided by the timely information made available from this invention is optimized due to the sender's mobility, speed, privacy and security facilitated by Short Messages as compared to plain voice communications over radio frequencies prone to static and other interference.

Along the same operating lines, Other terminal 328, issues a data stream that is interpreted by THS 312 to query, interact, update, respond or operate upon Other Application 320, which comprises one or more databases, of the financial, or other type. As described in operation with the previous applications, THS 312 performs intelligent data checking, and reformatting to allow other terminal 326 access to one or more applications such as Other Application 320. Terminal 328 can query and/or request data from THS 312 that THS 312 will locate in one or more external or internal data bases. For example, stock quotations can be extracted from a database, as well as gold or other commodity prices, sports scores, weather predictions, airline schedules and arrival/departure times and the like.

Interface method 2

Figure 4:
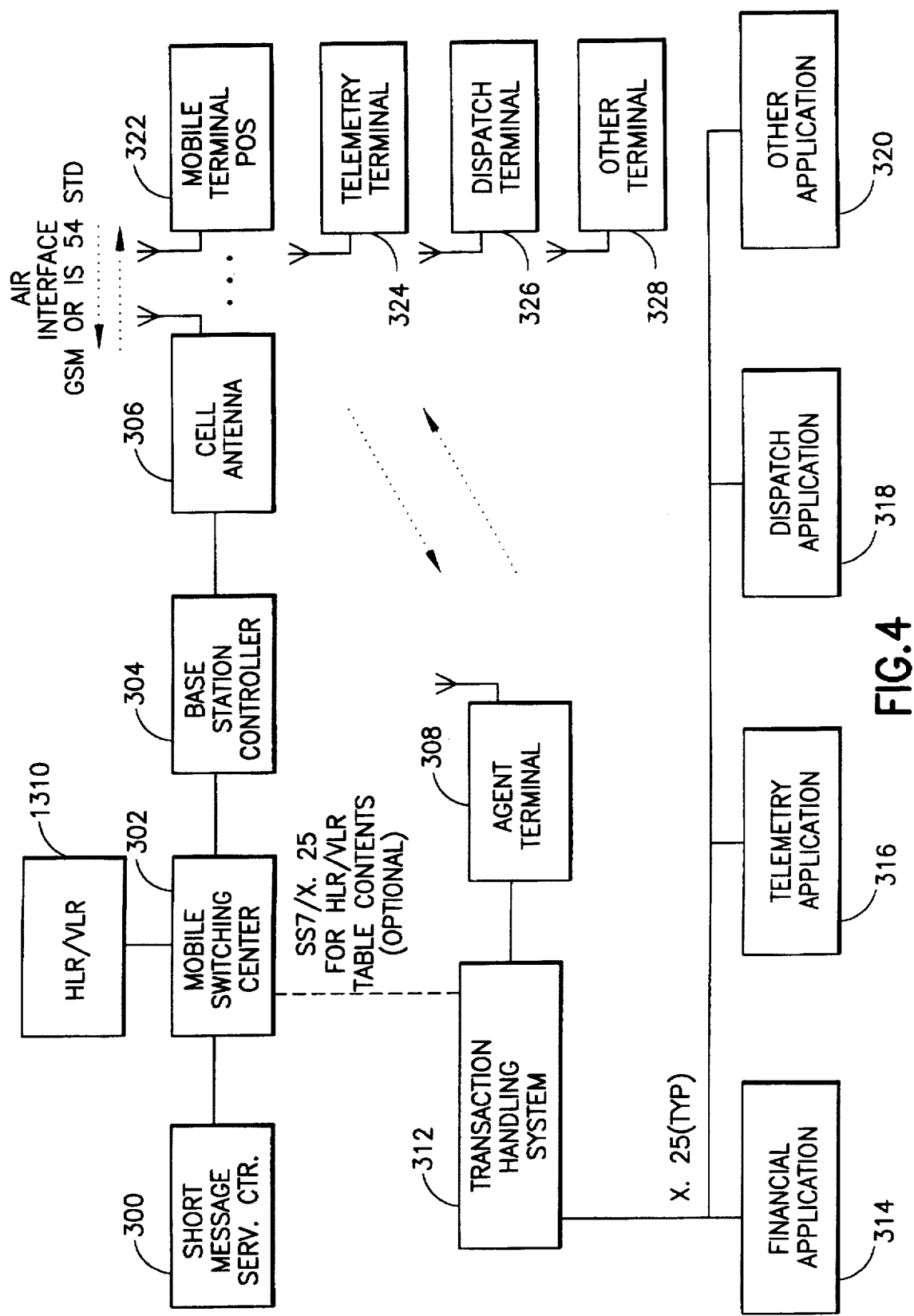
FIG. 4 is a diagram of a THS of the present invention interfaced via a cellular (air) interface to an existing SMSC.

FIG. 4 shows THS 312, performing the same functions as those delineated in FIG. 3. In FIG. 4, however, the interface to SMSC 300 is via Agent terminal 308. In this configuration, mobile terminal (POS) 322 for example, sends data to cell antenna 306, and from there to SMSC 300, via Base Station Controller 304 and MSC 302. SMSC 300 routes the data back through MSC 302, controller 304 and antenna 306, addressed to agent terminal 308. Agent terminal 308 passes the information to THS 312 which operates upon it as described in FIG. 3. This method is applicable for relatively low traffic applications where the amount of Short Message traffic can be handled by a cellular terminal interface.

Interface method 3

Figure 5:
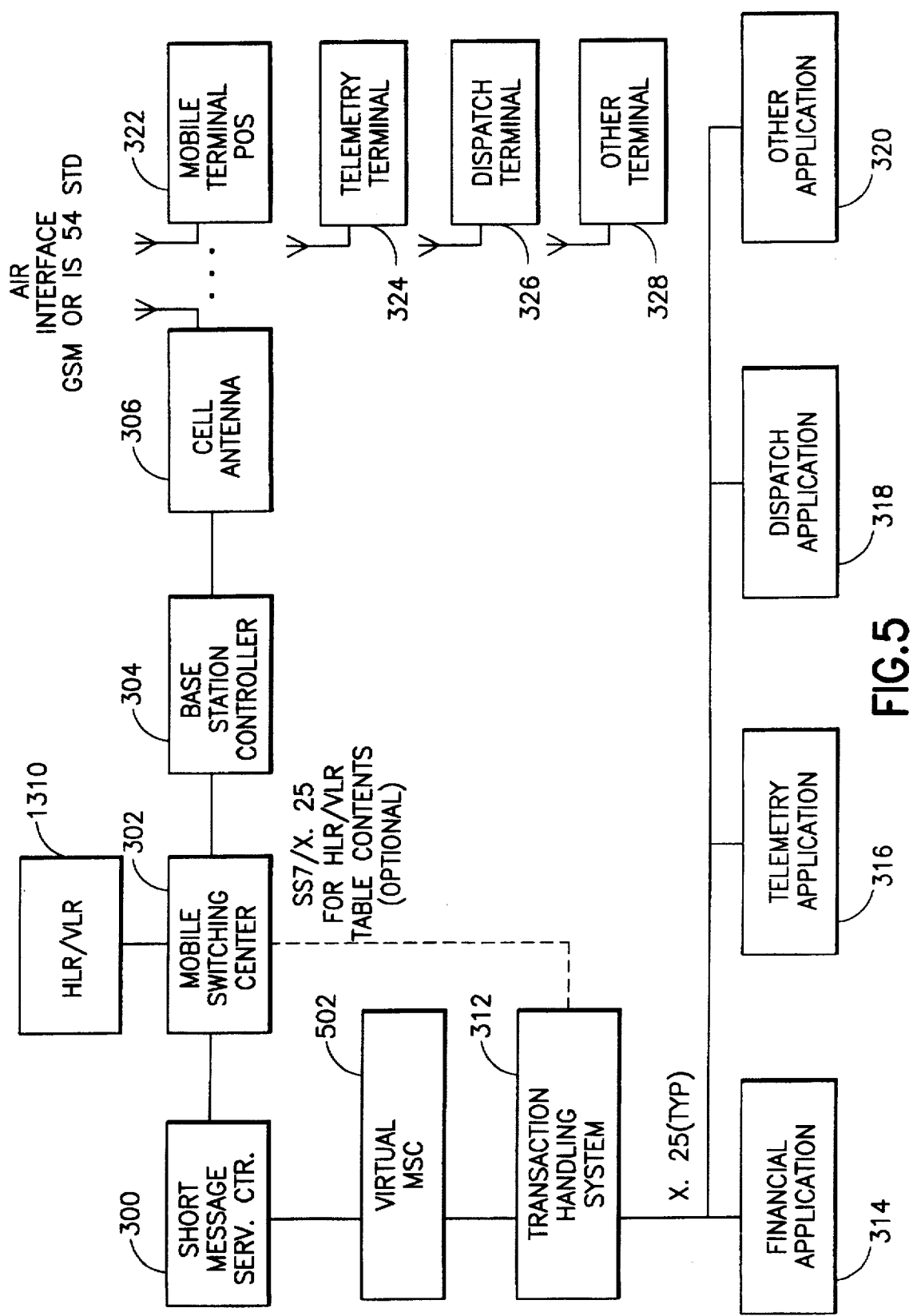
FIG. 5 is a diagram of a THS of the present invention interfaced via a virtual Mobile Switching Center (MSC) to an existing SMSC.

FIG. 5 shows THS 312 interfaced to SMSC 300 via a virtual MSC 502. Virtual MSC 502 simulates a Mobile Switching Center, such as MSC 302. Virtual MSC 502 appears to SMSC 300 from a software and hardware point of view just like another MSC 302, thereby allowing the interface to THS 312 to require no software modification of an existing SMSC, such as SMSC 300. The interface between SMSC 300 and virtual MSC 502 simulates the well known interface between prior art generic MSC and a typical SMSC. Therefore interfacing of a THS 312 configured to appear as an MSC, to an existing SMSC 300 part of a network, is closely similar to the installation of a generic MSC into the network.

Interface method 4

Figure 6:
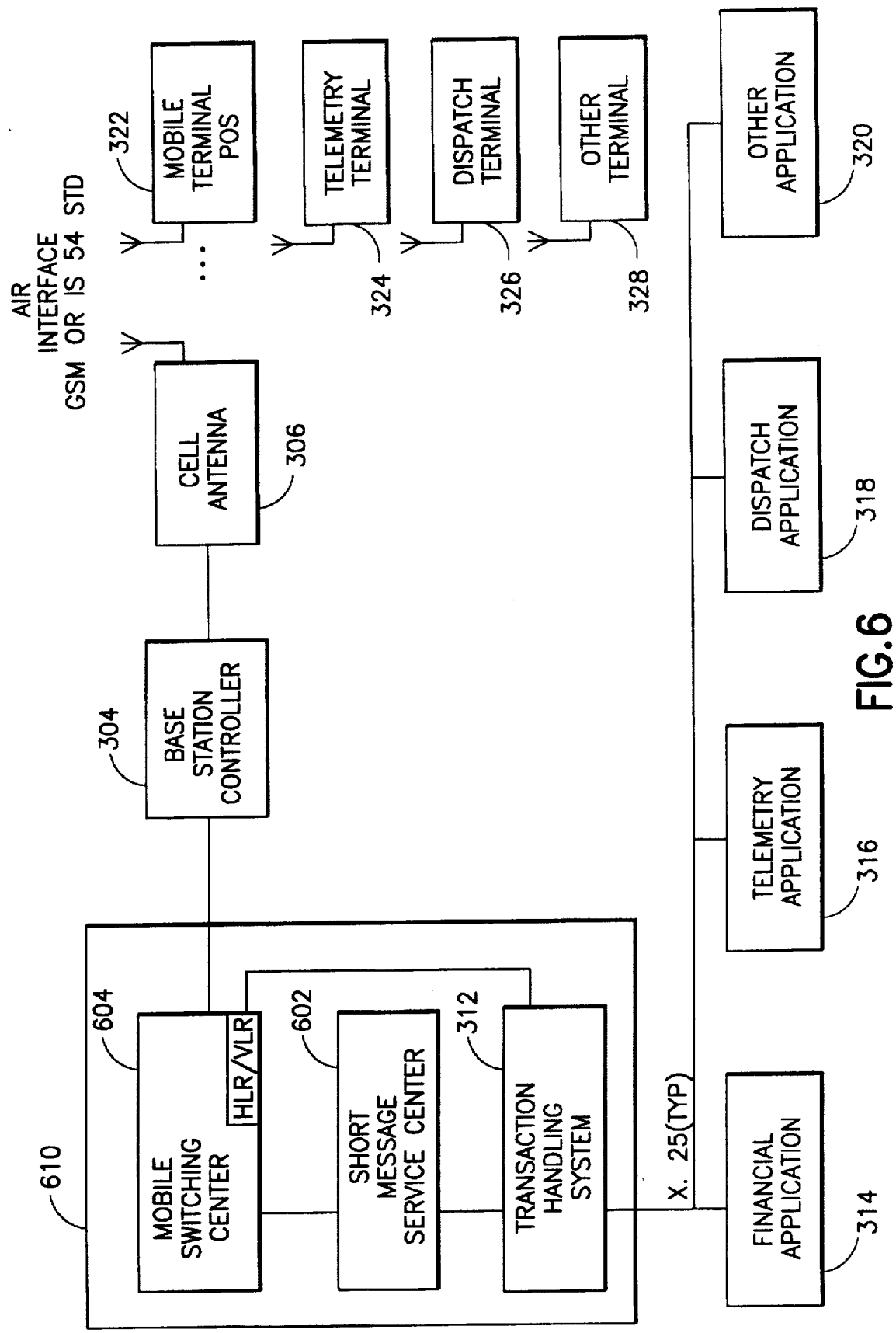
FIG. 6 is a diagram of a THS of the present invention interfaced to terminal units wherein the THS, SMSC, and a MSC are integrated within one unit.

FIG. 6 shows a THS 312 using a direct air interface to Mobile Terminal (POS) 322, telemetry terminal 324, dispatch terminal 326 or other terminal 328. The SMSC required to route Short Messages to and from THS 312 is now contained in SMSC 602, part of overall package 610. In operation, SMSC 602 provides a full protocol as required by GSM, IS 41, IS 54 or other wireless/cellular PCS standards. In the alternative, where full compatibility with an Integrated Services Digital Network (ISDN), GSM and IS.41 is not required, a simplified protocol is provided to accommodate a reduced number of terminals, such as mobile terminal (POS) 322, or telemetry terminals 324, in a limited geographic area.

Clearly, one skilled in the art can combine the features shown in FIGS. 3, 4, 5 and 6 to arrive at yet another combination embodying the inventive concepts shown herein.

Message Structure

The general message structure to be exchanged between a terminal, such as mobile terminal (POS) 322 and THS 312 is shown in FIG. 7A. In general, a message between THS 312 and POS 322 will be made part of a TCAP envelope typical of a Short Message, wherein the 140 byte message specific portion (or payload) is adapted for use with this invention. It is noted that the TCAP message shown in FIG. 7A will flow between land based units such as THS 312 and SMSC 300, but does not represent the air interface message structure. The message specific part (or payload) is compressed, if needed, encrypted, for example, in accordance with established block encryption methods, as described by DES, or IDEA, or other methods such as public key systems similar to those published by RSA Data Security, Redwood City, Calif.

Figure 12:
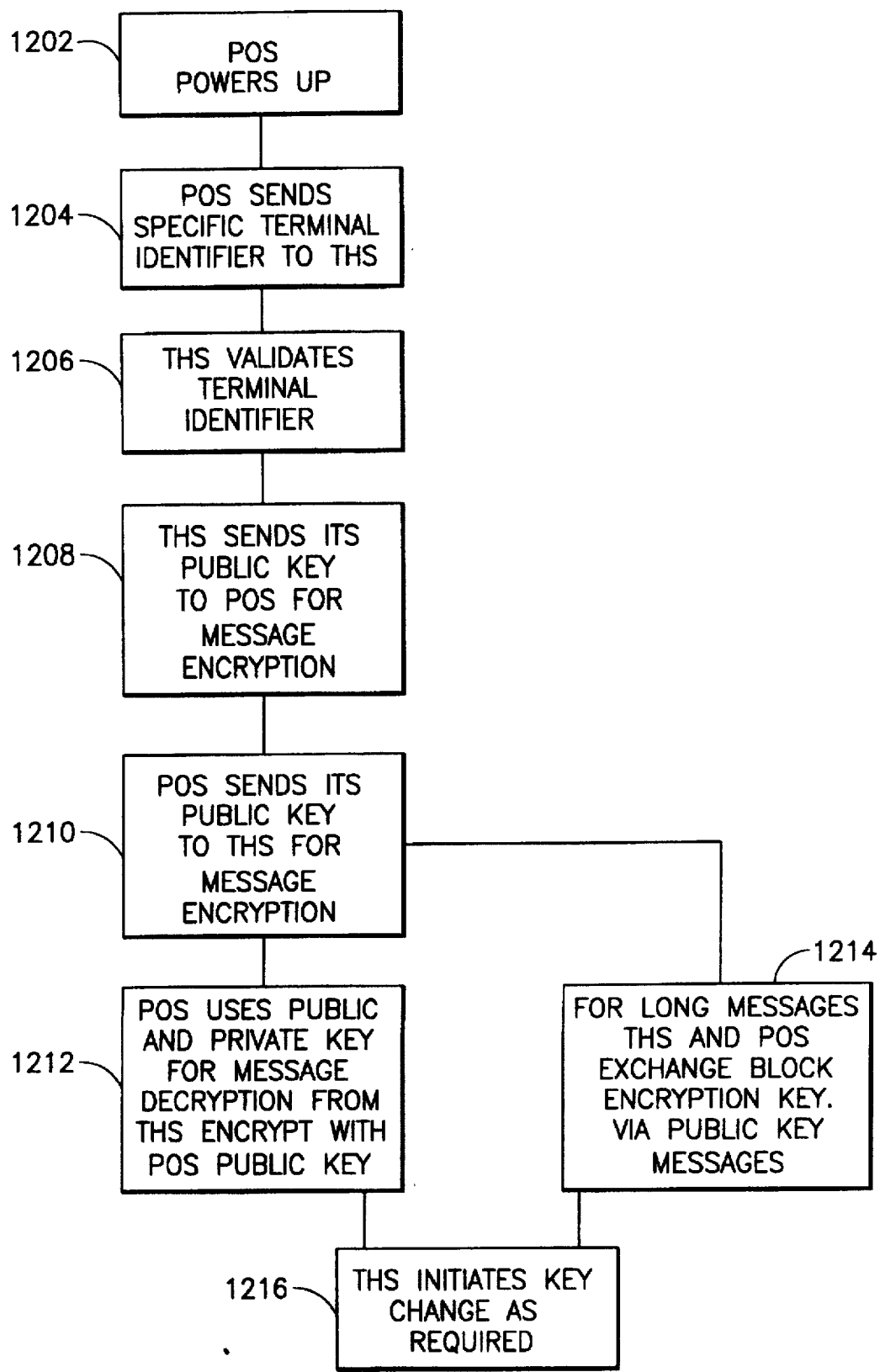
FIG. 12 is a diagram of the steps associated with the encryption and decryption of messages exchanged between the THS and a POS terminal using public key (RSA) and block type (DES, IDEA) encryption.

DES and IDEA block type encryption and decryption requires that the encryption/decryption key be known by both the sender and the receiver and is therefore generally transmitted via a secure channel. One choice for a secure channel is to mail the encryption key to lawful owners once per month along with the bill for manual input of the key into a POS for usage with the THS. Each key is unique for each POS. This, however, is not the preferred method. The preferred method is to use a public key system (RSA type) for sending the key required by block type encryption/decryption methods, such as DES, and IDEA. For long and/or high data rate messages IDEA encryption is used, where the key has been exchanged previously using RSA techniques. This is illustrated in FIG. 12 and discussed later in the application. The preferred alternative to to the use of the DES algorithm is IDEA, and has been described in U.S. Pat. No. 5,214,703. The IDEA algorithm is in many respects advantageous for use in the present invention because of software implementation advantages over the DES algorithm.

Note that unlike a typical two way phone connection, use of the Short Message capability does not require an immediate reply in real time, since the connection is one way. In fact, one advantage of using short message capability within THS 312 is the ability to delay and retry a transmission to overcome, for example, a temporary loss of transmission capability within the network, or the unavailability of a terminal because of a "busy", "inactive" or "unavailable" condition.

The message specific (payload) part of FIG. 7A has the following allocation:

Message length—identifies the length of the message in bytes, out of a total of 140 bytes.

Message correlator—uniquely identifies the message sent by either a POS terminal or THS 312. The initiator of a message, either a POS or a THS, assigns the correlator number to a particular message. This correlator number then is used for the reply by the recipient of the message. It should be noted that a similar quantity, used in a GSM environment for network operating purposes, called "message identification", is not sufficiently detailed for the purposes of this invention as it may not identify all messages to the level required for a correct address and a timely reply.

In general, the Message Correlator identifies, for subsequent correlation with a possible reply within THS 312, the transaction being transmitted from the terminal as well as the number of short messages that may need to be considered to form a complete transaction query. This identification is made up of one or more of the following, for example, a combination of the time of day internal to the terminal, the transaction count internal to the terminal, and the terminal hardware identification, or equipment number, or manufacturer's number, generally permanently embedded in the hardware of the terminal during manufacture.

Message context—identifies whether the message is a financial, telemetry, dispatch, or other application specific transaction.

Application identifier—identifies the transmission as having originated from or for a particular application, for example a financial transaction, or a telemetry application, a dispatch application or "other".

Message Type—identifies whether the message is directed to a typical application. For example, if the message context is "financial", the message type may be Visa, Mastercharge or American Express. This pointer shows very quickly where a query is to be directed.

Currency type—identifies the type of currency used in the transaction.

Currency Amount—identifies the amount of currency used for the transaction.

Account number—identification of account to be used by a bank, or other financial institution for completing a transaction.

Bank Identifier—identifies which bank is responsible for the account specified in "account number". While this may be sometimes redundant since occasionally the account number will contain the bank identifier, it is provided to facilitate the processing of the information.

Decline/Accept—identifies in a response from a financial query whether the transaction can be completed or not.

Meter type—describes in telemetry applications what type of a meter the data is coming from. For example, the data could come from an electric watt-hour meter, a water meter, a gas meter or a meter designed to time the usage or duration of a telephone or cable television service.

Meter reading value—describes the units in which the "meter type" operates. For example, a watt-hour meter would output the number of kilowatt-hours, while a gas meter would output cubic feet metered.

Bar Code type and bar code reader value—describe the type of bar code being read and the value being read, respectively. For example, the type may be the well known Uniform Product Code (UPC) type, while the value is the multidigit identification associated with a particular consumer product.

Location data—describes general geographic position, for example, longitude, latitude, elevation and/or house number, street name, town, nearest landmark and the like. This data is used in conjunction with a Ground Positioning System (GPS), possibly augmented by accelerometer readings, and/ or a display. When output by a POS unit equipped with a GPS, the position will be that of the GPS. However, when output from the THS 312, the position may be related to a location where a delivery or pick-up is to be made or an update to GPS position, or a calibration quantity for the accelerometers.

Additional data—describes text attributes, or visual details that are required to enhance the display (e.g. font, display size), or to be printed at the POS. In the alternative, this field may be used to send the Public Key required with RSA type encryption/decryption.

Figure 7B:
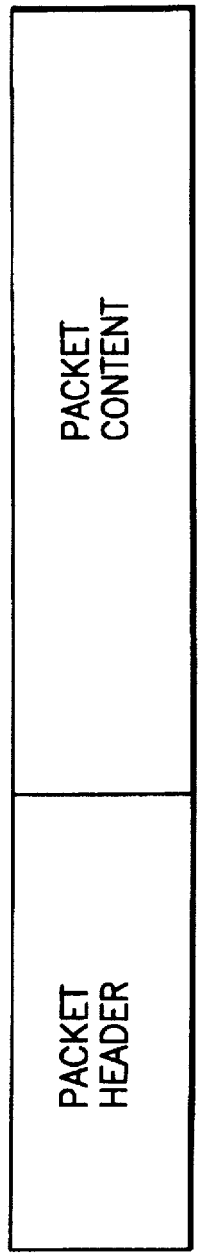
FIG. 7B is a diagram of the structure of a message between a typical THS 312 as shown in FIG. 3 and a typical application, such as financial application 314 in FIG. 3.

FIG. 7B describes an example of a typical message between THS 312 and a financial application 314 being carried in the network by, for example, the well known X.25 protocol. FIG. 7B message contains the query to application 314 interpreted from data sent from POS 322, using a message structure as shown in FIG. 7A. To arrive at a database query such as that shown in FIG. 7B, THS 312 interprets a message as shown in FIG. 7A into a query compatible with, for example, a database external or internal to the cellular network, or THS 312, such as application 314 or application 316. For example, the message structure in FIG. 7B to be delivered by THS 312 is specified by VisaNET V.I.P. System Message Formats, Base 1, fox credit card authorizations, requests, responses and advises, said specification issued by Visa International Service Association. This specification identifies certain requirements for a query to its financial database. Specifically, within this specification, there are references to such application specific items as "processing codes" in field number 3, "systems trace audit number" in field 11, "acquiring institution country code" in field 19 and others that do not have a direct counterpart in the message structure of FIG. 7A.

Therefore THS 312 has to interpret the incoming data on the signaling channel as follows:

1) receive the message, or query, from the POS in a format as specified generally in FIG. 7A;
2) separate this message into its various fields;
3) compare the contents in each field to the needs of a query to a destination database, such as application 314;
4) translate the content of each field in message 7A to a corresponding field in message 7B.

The interpretation is not limited to a one to one shifting of the content of a field from the message in FIG. 7A to a field in the message of FIG. 7B, but rather involves the interpretation of one or more fields in FIG. 7A for proper compatibility with one or more fields in FIG. 7B, directed to one or more applications, such as financial applications 314 and/or dispatch applications 318, and/or "other applications" 320. In general, THS 312 can interpret a single incoming message, or a sequence of them, of the type shown in FIG. 7A, to formulate one or more queries, compatible with one or more applications, resident either within THS 312, or external to THS 312, such as, for example, a financial application 314.

The interpretation step also comprises filling missing information, if necessary. If a portion of the query in FIG. 7B is not directly available from the message in FIG. 7A, that field is filled from data stored in a table or database contained within THS 312, or from instructions contained within THS 312. Conversely, fields present in FIG. 7A, such as the correlator number, that are specific to the present invention, and likely not present in an application of the type addressed by FIG. 7B, are either interpreted for use in one or more queries as shown in FIG. 7B or ignored.

A part of the message in FIG. 7A is the message correlator and message identifier. One or both of these are used within THS 312 to form a unique identifier for uniquely identifying the incoming digital information. This unique identifier is used to also identify the source of the message for subsequent correlation with a reply from one or more databases the original query was directed to. The same process is generally duplicated in the POS, wherein a particular incoming message is associated with a particular query by referring to the unique identifier for the message stored within a table of query/message identifier. Based on this table the message can be displayed, printed or used to activate a sound source to deliver a verbal message, or perform any other functions the POS is capable of.

When a message, or query reply, is returned from an application, such as, for example, a financial application 314, another interpretation is performed wherein a message, for example, as shown in FIG. 7B, is interpreted to be compatible with the structure shown in FIG. 7A. The interpretation is similar to the one discussed above in that information contained in various fields of the FIG. 7B message is interpreted, using internal tables, databases and instructions to generate a message compatible with short message operation, as shown, and, for example, with the data structure shown in FIG. 7A.

One or more messages from one or more terminals such as, for example, POS 322 and/or dispatch terminal 326 are processed and interpreted concurrently in THS 312. Conversely, THS 312 also interprets the query response from, for example, application 314 to a message compatible with POS 322 and its input/output devices, and the SMSC. In effect, THS 312 interprets, and correlates a plurality of messages from a POS, as shown in FIG. 7A, with query responses typically shown in FIG. 7B, to facilitate the communication from different types of terminals, for example POS 322, telemetry terminal 324, and/or dispatch terminal 326 with one or more applications, for example, financial application 314, telemetry application 316, and/or dispatch application 318 having one or more, possibly incompatible, format and field structure and content requirements.

It is understood that FIG. 7B refers, for example, to a protocol such as the Visa protocol, an application of which is generally discussed in U.S. Pat. No. 4,796,292. This protocol is generally associated with the access to a financial database, such as, for example the ones available from Visa International Service Association, or American Express Company.

THS Software Layers

Figure 8:
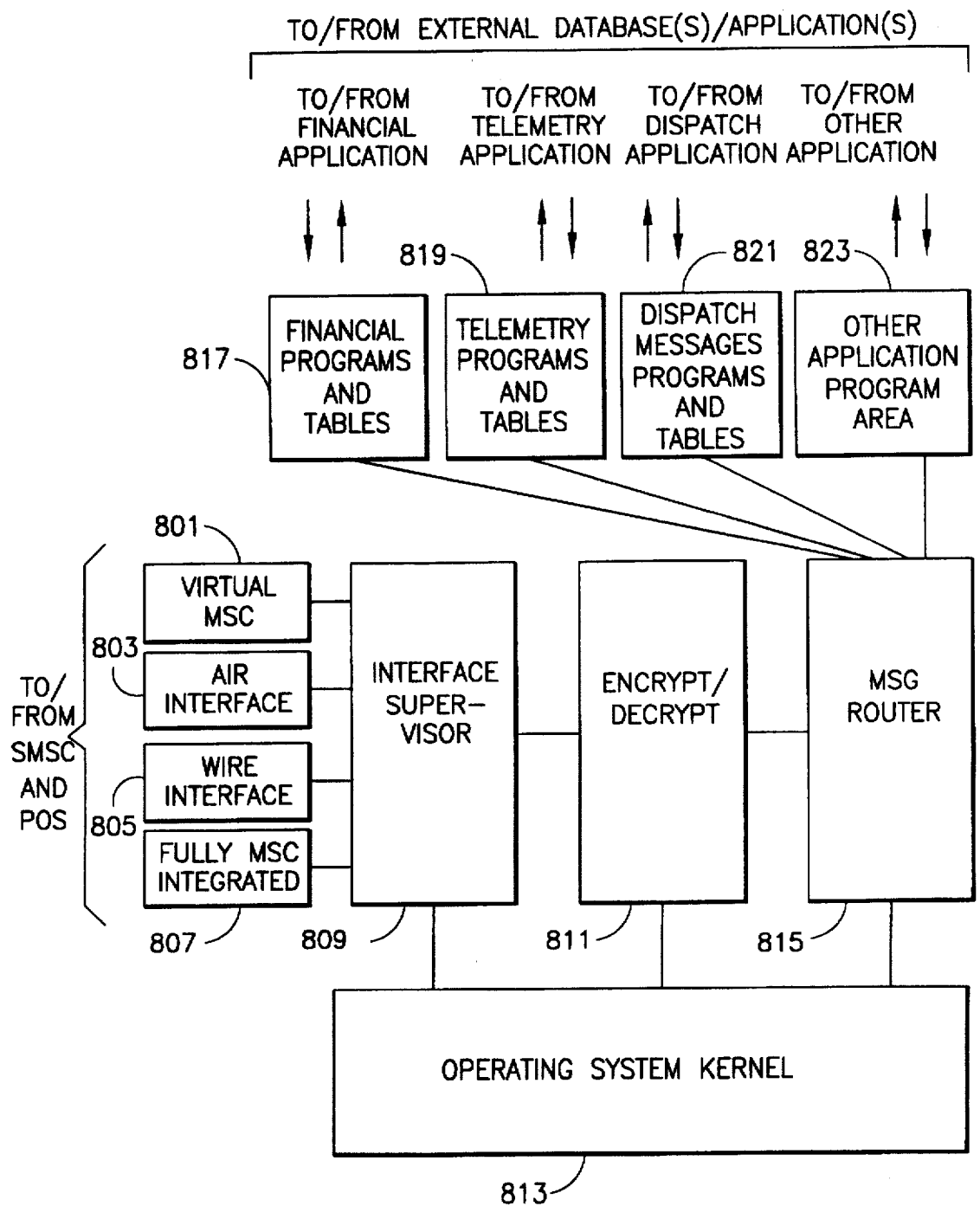
FIG. 8 is a diagram of the software layers present within a typical THS, as shown in FIG. 3.

FIG. 8 shows the THS software layers used to accommodate and process the interpretation of a first message structure, for example of the messages shown in FIG. 7A, to a second message structure having a different content, as for example shown in FIG. 7B. In FIG. 8, digitally encoded information, possibly encrypted, from a typical terminal having Short Message capability is received or transmitted in one of four possible ways, either through a virtual MSC 801 as shown in FIG. 5, an air interface 803 as shown in FIG. 4, a wireline interface 805 as shown in FIG. 3, or from a fully integrated MSC 610 as shown in FIG. 6. From here, the TCAP, or similar, envelope of the message is detected or formatted depending on whether the message is incoming or outgoing, in Interface supervisor 809. Encrypt/Decrypt function 811 decrypts the contents of the 140 bytes of the message specific part (payload) of the TCAP contents sent to it by supervisor 809. Message router 815 examines the message correlator ID and the application identifier to send the information to either a process running in Financial application area 817, or another process running in telemetry area 819, dispatch messages area 821 or "other" area 823. Each of these processes in turn, examine the content of their respective message and interprets the data contained therein for compatibility with a query to the data base to be accessed. Conversely, a query reply in the format of FIG. 7B is interpreted for compatibility with the format of FIG. 7A for POS reception. The message to a POS is also encrypted via encrypt/decrypt function 811 and routed through one of the four ways it was originally received.

The process of interpretation of messages, such as shown in FIG. 7A and FIG. 7B, involves, for example, certain tables, databases and list of instructions, specific to each application containing instructions for performing the interpretation process. For example, in financial area 817 the incoming data from a POS is first separated into its individual field components. The amount of the transaction is, for example, interpreted from the POS supplied value and format, to a new format and value compatible with the destination the query is directed to. For example, the incoming financial transaction may be denominated in Italian Lira, but the data base to be accessed may require the information in U.S. dollars. THS 312 would interpret the query in Italian Lira, convert at the current rate of exchange into U.S. dollars plus a dollar premium related to the typical length of time required for the transaction to clear and the variance of Lira to dollar exchange rate over the past 30 days. Such a conversion to dollars, if allowed by the credit card issuer, may well be more beneficial to a credit card holder as compared to blocking out a larger block of credit based on other, possibly more conservative, and costly criteria.

Furthermore, the data may be interpreted by including information not sent by the POS (for example time of day) but possibly required for a valid query to the financial database. Another possibility is to interpret the message as not adequate, or insufficient for a query, wherein an "error" message is generated in THS 312 for return to the POS.

In the event a fraud situation is detected, a specific message is generated for sending to the POS to alert the operator of such a condition. Fraud detection is typically based on comparing time intervals between transactions with their geographic location. If the same terminal and its specific identifier is used in widely geographically separated locales, but with short time intervals, the transaction is deemed fraudulent, and blocked. Other criteria for fraud detection may be supplied by other parameters based on a priori knowledge of spending patterns, preferences, and the like. For example, if the same credit card is used within certain pre-established criteria, a transaction blocking due to fraud detection may be activated.

Another function of, for example, Financial Programs and Tables 817, is to correlate an incoming query response from external databases or applications with the originally sent query received from a POS via an SMSC. This correlation is done by keeping a table descriptive of the original cellular network address of the POS and the unique identifier of the query and the expected uniquely identifying feature of the reply to the query. When analyzing an incoming query reply, this table is consulted to determine the network address to direct the interpreted reply to.

An operating system kernel 813 generally coordinates the interaction of the functions and processes enumerated above to allow for efficient memory allocation in accordance with each need.

The Financial function

Figure 9:
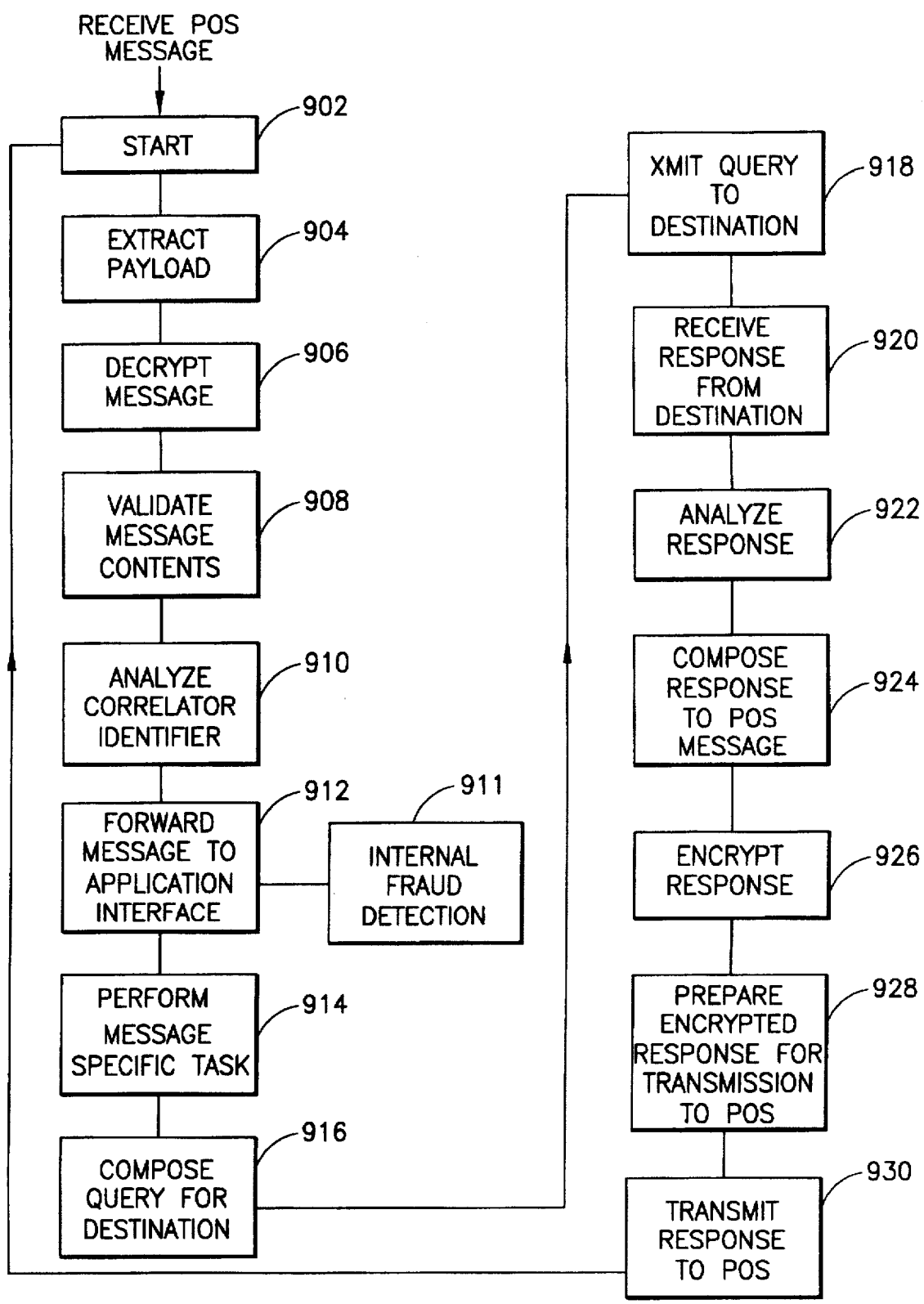
FIG. 9 is a flow diagram of the steps performed within a THS of the present invention in response to a message shown in FIG. 7.

A typical financial transaction using the structure described above is shown in FIG. 9. First, the TCAP message as shown in FIG. 7A is received at the Start step 902. Its relevant content, in the message specific part (or payload) is extracted in step 904. The message is decrypted in step 906. The validity of the message is determined by examining the structure of the message in accordance with FIG. 7A, for example by searching for the presence of data located as indicated by the MSG length field.

Next, the application identifier and/or correlation identifier are read in step 910 to determine the type of transaction from a table stored within message router 815. Message router 815 forwards the message to the proper application 817, 819, 821 or 823 in accordance with step 912. The correlation identifier read in step 910 is used to identify which transaction is addressed by the incoming message.

Within step 912, where the message is forwarded to the application designated within the incoming message, a local fraud detection step 911 is implemented to insure that the transaction is in accordance with time and distance limitations dictated by the fraud checking mechanism. Fraud detection is performed by analyzing, for example, up to three previous transactions coming from the same physical POS device (having the same identifier). The needed information is contained within the message correlator as discussed in FIG. 7A. This operation compares the time and physical location of a terminal actively using the network. If one in the series of three transactions are widely dispersed in space but extremely close in time, as for example if the inquiries from the same terminal are separated by more than 100 miles, but the inquiries are only 1 minute apart, the THS may reject the transaction as invalid and issue a warning to the terminal in question.

The specific task required by the message is analyzed and performed in step 914.

In step 916, a query to a destination, such as application 314, 316, 318 or 320 is composed. The composing step comprises interpreting the received message from the POS, which, in turn, includes reformatting and reconfiguring the message for compatibility with the format required by the destination, such as a database associated with, for example, application 314. This step also extracts the address of the originator, associates it with the query in a table to be used to correlate the subsequent, incoming query reply with the originating POS address.

In step 918 the query is transmitted to a destination, such as application 314, 316, 318 or 320. A query response is received in step 920. The query response is analyzed in step 922 to insure that it contains the information asked for in step 916. If the requested information is not present, the query to the destination is re-sent, typically, up to three times. If the response does contain the requested information, a message containing the desired information is composed for transmission to the POS in step 924. The response from financial application 314, or database, is encrypted and transmitted to the POS in steps 926, 928 and 930. Another function in step 928 is to analyze the table correlating queries, query replies and originator addresses created in step 916 to extract the proper cellular network address the query response is to be directed to.

Standard software self checking is employed, such as, timing for various functions, error condition detection, retries and recovery, and error message outputs.

The Telemetry function

In the telemetry function, the general POS function is replaced by a utility meter, such as a water, gas meter or watt-hour meter. In this telemetry function, the watt-hour meter transmits a reading to THS 312 either at a pre-selected time interval, or, when asked to do so by THS 312.

This same telemetry function can be used in conjunction with a cable unit to meter and/or activate cable television or service to a particular location.

Yet another application for the telemetry unit is for the operation of an alarm. For example, a smoke detector is interfaced to automatically issue a message to the THS alerting about a possible fire condition. Similarly, a temperature alarm is used for over or under-temperature situations to detect freezing or temperatures above a certain threshold.

Well known infra-red, ultra sonic or other type of motion detectors can also be interfaced to the alarm telemetry unit to report unauthorized entry on protected premises. It should be noted that the alarm telemetry unit is not limited to on-off type devices, but can be used with an analog to digital (A/D) converter to provide monitoring of varying, continuous parameters, such as temperature readings over a temperature range.

The Dispatch function

The dispatch function coordinates messages and the output from a Ground Positioning System, (GPS), possibly augmented from inputs by on-board accelerometers, to provide a means for locating a delivery or emergency vehicle. The dispatch terminal displays text descriptive of the next destination of the vehicle, and instructions as to how the next destination is to be reached. The GPS output is transmitted to THS 312 and is used to confirm a location reported by the occupant of the vehicle, as well as confirm vehicle progress to the next location. Furthermore, THS 312 computes directions to be followed by the vehicle to reach its next destination.

The Terminal Function

Figure 10:
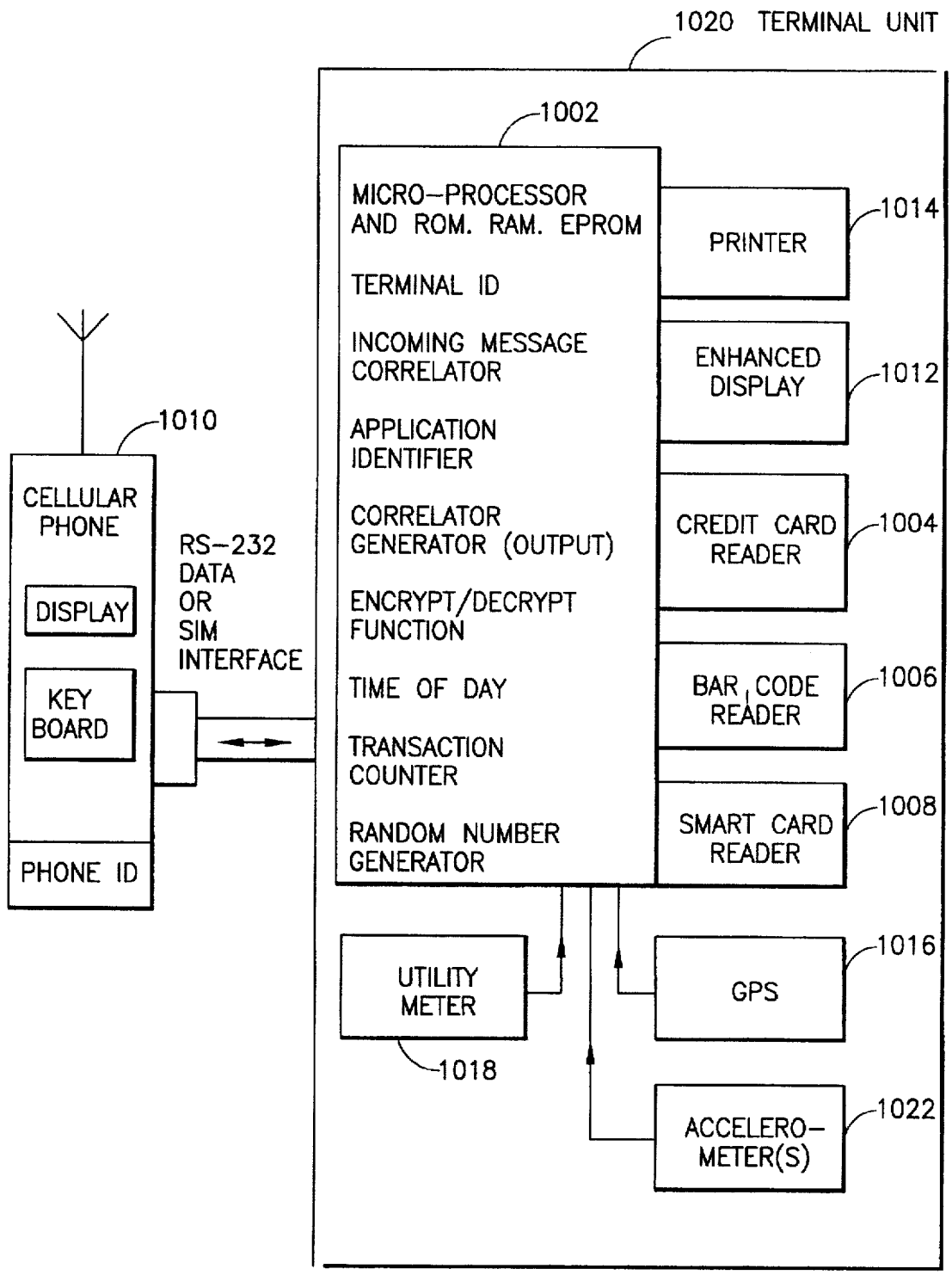
FIG. 10 is a diagram of a POS terminal unit capable of conducting transactions via a typical THS 312, as shown in FIG. 3, of the present invention.
Figure 11:
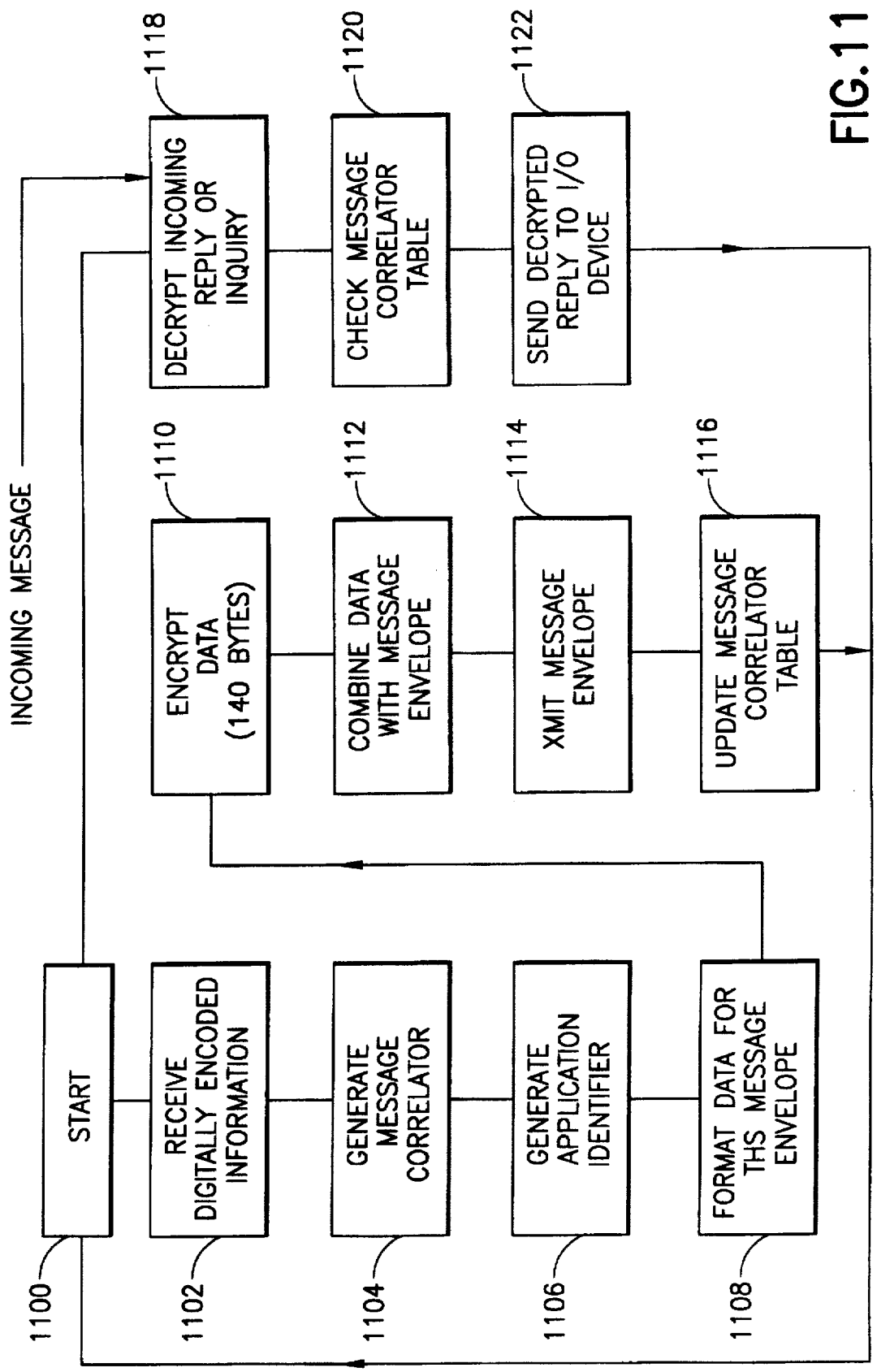
FIG. 11 is a diagram of the software steps within the terminal unit 1020 of FIG. 10 enabling the message exchanges required by a terminal unit and THS combination of the present invention.

The function of a POS terminal such as, for example, mobile terminal (POS) 322 in FIG. 3, can be better understood by reference to FIG. 10 where a terminal unit 1020 is described. FIG. 11 describes an example of the software flow diagram of terminal unit 1020. Terminal unit 1020 comprises one or more input devices such as credit card reader 1004, bar code reader 1006, and/or smart card reader 1008. In addition, printer 1014, enhanced display 1012, ground positioning system 1016 or one or more utility meters 1018 can also be part of terminal unit 1020. Terminal unit 1020 has an internal micro-processor linked to non-volatile ROM, non-volatile, remotely programmable EPROM, work area RAM and interface capability, preferably via a well known RS-232 port, or SIM interface for communications to a means to access the cellular network, such as a cellular phone 1010. Cellular phone 1010 also has a display that can be used whenever terminal unit 1020 is not equipped with a display, to present output from incoming short messages by terminal unit 1020.

Terminal 1020 has its own terminal identifier, separate and distinct from the phone identifier, part of cellular phone 1010. The phone identifier is generally associated with the operation of the cellular network, while the terminal identifier is associated with the identification of the terminal for operation with THS 312.

The functions performed internally to terminal unit 1020 are shown in FIG. 11. There are two ways to input information into terminal unit 1020. First, digitally encoded information, arriving from, for example, credit card reader 1004, bar code reader 1006 and/or smart card reader 1008, generates an entry in the message correlator table in steps 1102 and 1104. The message correlator identifies uniquely the message. The message is then appended an application identifier in step 1106 to identify its content as to a particular application. The message, its correlator number, and application identifier are formatted to fit inside the 140 bytes allocated for the message specific part of a cellular Short Message, eventually reformatted into a TCAP message compatible with the SMSC of the cellular network. The 140 byte space is filled to contain exactly 140 bytes, if necessary, and then encrypted to again fill no more than 140 bytes. Message contents can be spread over more than one message if message length exceeds 140 bytes. The 140 bytes are then combined with the header to generate a typical TCAP compatible message in step 1112 within the cellular network. Once the message is sent to the THS via cellular phone 1010, the message correlator table is updated in step 1116.

The second way to input information into terminal unit 1020 is to have an incoming message from cellular phone 1010 originated by THS 312. This message is first decrypted in step 1120 and compared against the local correlator table in step 1120. Once the exact input/output (I/O) device is identified for the message from the correlator table, such as a printer or a display, or the GPS for a GPS error correction, the message is buffered for eventual, if not immediate, transmission to the proper I/O device.

When equipped with a GPS unit 1016, terminal unit 1020 is capable to report its position from signals received by the GPS unit 1016 to aid in navigation. Whenever the GPS signal from the satellite is temporarily unavailable, on board accelerometers 1022, provide motion information and positional updating. Depending on the motion accuracy desired, one, two, or more accelerometers are used. In the case of multiple accelerometers, accelerometer sensing axes are generally orthogonally oriented to each other. For example, silicon micro-machined, batch processed, 5 g accelerometers can be used such as part number ADXL05, manufactured by Analog Devices, Norwood, Mass.

Position information is reported by GPS 1016 and accelerometers 1022 to processing unit 1002. This position information is encapsulated in a message by processing unit 1002. The message is transmitted from processing unit 1002 to cellular phone 1010 to THS 312 using an SMSC. Conversely, GPS unit 1016 can have its position reporting refined by the input of exact coordinates supplied by THS 312 from its internal databases. The updating by a position report from THS reduces the error inherent in the degraded signal provided by satellites normally supplying signals to the GPS system.

Another application of terminal 1020 is to interface to a financial database wherein stock quotations are reported to the terminal on a regular basis. For example, terminal 1020 requests stock transaction data, such as price, volume, short positions, call/put ratio, or the like, for a particular stock, or group of stocks, in one or more industries. THS 312 in turn accesses databases that are relevant to this request and interprets the information from the databases to provide the requested stock related information. The report is either printed on the printer, or displayed on the screen or stored in internal memory for future review or download by the user.

Encryption—Decryption

FIG. 12 describes the interchange of generally public key type (RSA) based messages for the encrypt/decrypt function between THS 312 and POS 1020. Upon power up, in step 1202, and 1204, a POS terminal unit, such as 1020, sends its own specific terminal identifier to the THS. The Short Message structure required by the cellular phone network to recognize the presence of cellular phone within a cellular cell is supplied by cellular phone 1010 from its internally stored identification codes. In the alternative, terminal 1020 sends its specific public key and terminal identifier whenever a register allocated to hold a (public) decryption key is either empty or has not been updated, for a pre-determined period of time. This time interval for key renewal is used in cases where the RSA algorithm is run with a small modulo, of about 256 or less to trade off security versus machine loading considerations or security breach instances. If larger moduli are used, as for example 512, 1024, 2048 or larger, the overall key generation and encryption may be slower, but may only need to be performed at longer intervals, perhaps only once.

In response to receiving the terminal identifier along with its public key, THS 312 validates the received public terminal identifier by comparing it to a table of valid terminal identifiers stored within THS 312. If the terminal identifier is valid, THS 312, in step 1208, sends its THS public key to terminal 1020 for use by 1020 in encrypting future messages to THS 312. Note that the THS public key need not be protected because the public key will only encrypt, but not decrypt messages encrypted with the public key. Decryption of a message encrypted with the THS public key can only be done in conjunction with the THS private key, generated within THS 312, stored there, and never transmitted. The public key broadcast by THS 312 to terminal 1020 cannot decrypt an encrypted message from terminal 1020 encrypted with the THS public key.

In turn, terminal 1020 responds by sending its own public key so that THS 312 can encrypt messages sent to terminal 1020 in step 1210.

Having established the public keys for both THS 312 and terminal 1020, secure communication of financial information can be initiated in step 1212. For this, terminal 1020, or POS, uses its own private key, stored internally within terminal 1020, to decrypt public key encrypted messages from THS 312. In the alternative, THS 312 can initiate a "public key request" as shown in step 1216. As yet another alternative, the message may be compressed for efficient transmission.

For long messages, or where the data rate from terminal 1020 is relatively high, the RSA algorithm is supplemented with DES or IDEA type block encryption. The actual key used for a block encryption algorithm such as, for example, DES or IDEA, is transmitted by THS 312, using RSA, public key type, encryption. The key used in the block encryption algorithms are then extracted, or decrypted from the RSA encrypted message and used by terminal 1020 to encrypt its long message. In effect, the key required for block encryption and decryption at both ends, THS 312 and terminal 1020, is securely exchanged via public key (RSA) type encrypted messages.

Interactive Services

Yet another application of the Short Message based system described herein is its use in an interactive services environment. For example, a cable television station can provide programming requested by a viewer using a POS operating in conjunction with a THS of the present invention to interpret the viewer request.

In the alternative, interactive games with multiple players can also be implemented with this invention. For example, a cable TV channel can be used as the high bandwidth display update means, while the Short Message system and THS send the manual inputs related to game control to a main computer running the video game on the cable channel. The combination offers high bandwidth video display with cost effective manual input control. Manual input control is provided with a cable television interactive game control unit capable of generating Short Messages, similar to those of a POS. These Short Messages are descriptive of the position of the input controls required for operation of the game and are interpreted by the THS for transmission to a video game control input means.

System Redundancy

Figure 13:
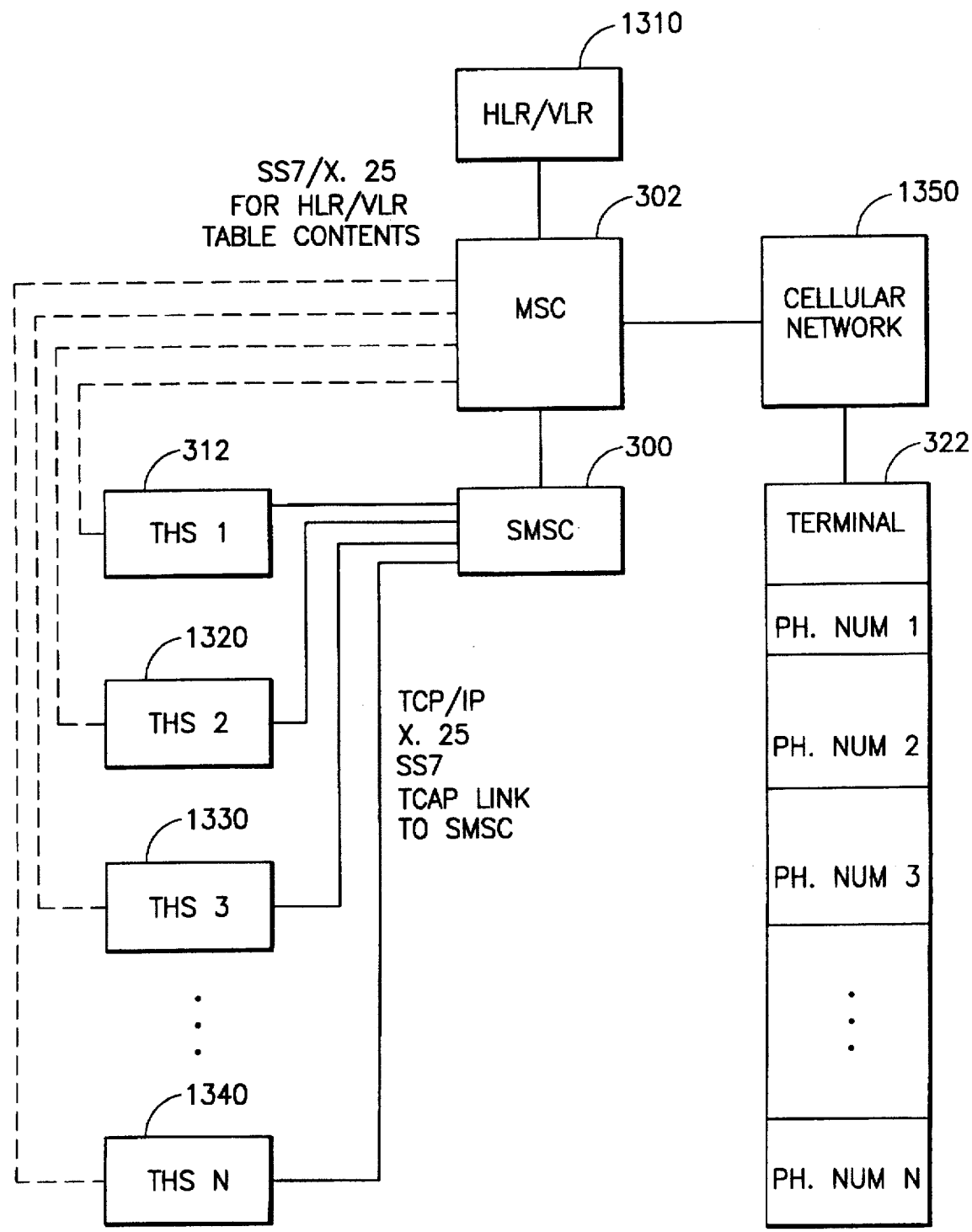
FIG. 13 is a diagram of the redundant structure provided by a plurality of transaction handling systems configured to avoid a major impact on query responses in the event of a single THS failure.

Provisions are made for THS's 312 occasional failure. Referring to FIG. 13, THS 312 failure will be detected by a terminal, such as terminal 322, by the absence of a response from THS 312 within a predetermined time period, such as, for example, 1 minute. If no response is received by terminal 322 from THS 312 within the exemplary 1 minutes, terminal 322 will transmit an "exception" inquiry, as part of the message described in FIG. 7A, requesting the latest results obtained from THS's 312 self-checking mechanism. The self-check mechanism within THS 312 detects partial faults within THS 312 as well as other anomalies in system operation such as delayed query replies due to high traffic levels or external database or application unavailability.

The reply from THS 312 to this "exception" request, expected by terminal 322 from THS 312 within a relatively short time, for example 30 seconds, constitutes a "health check" on THS 312. The reply will inform terminal 322 as to operational status of THS 312, and consequently the course to follow in the event THS 312 is only partially functional. If no reply is received from THS 312, then terminal 322 will assume that THS 312 is no longer available, and re-send its unanswered query to another THS, for example THS 1320, or THS 1330, or THS 1340. This is possible because terminal 322 is programmed to store a plurality of access phone numbers, PH NUM 1, PH NUM 2, PH NUM 3 . . . PH NUM N. Each of these access phone numbers corresponds to one of a plurality of THSs, for example PH-NUM 1 corresponds to THS 312, while PH NUM 2 corresponds to THS 1320. Each THS is capable of performing the message handling function directed to it. When terminal 322, connected to cellular network 1350, MSC 302 and SMSC 300 is unable to receive a reply from THS 312, or when the reply from THS 312 indicates that it is not fully operational, or when instructed to access another THS for traffic reduction purposes, terminal 322 will access, via PH NUM 2, THS 1320. THS 1330, or THS 1340, can also be accessed, depending on received instructions.

The functionality of terminal, such as terminal 3227 is checked by a THS, such as THS 312, by checking the home location register (HLR) aud visitor location register (VLR) 1310, typically present in a mobile switching center, descriptive of the status of terminal 322 in the network. While it is possible to check HLR/VLR 1310 before each message transmission from THS 312 to a terminal such as terminal 322, this may burden the network. Therefore, THS 312 will examine HLR/VLR 1310 only when a message from THS 312 to terminal 322 requiring a reply has hot been responded to in some time interval, for example 1 minute. The lack of a timely response from terminal 322 will initiate a search by THS 312 of the HLR/VLR to determine whether the terminal is "off line". If the terminal is "off line", the HLR/VLR will be requested by THS 312 to report terminal's 322 return to an "on line" or "active" status. Now the message to terminal 322 can be delivered by TI-IS 312 in accordance with the location stored in HLR/VLR 1310.

HLR/VLR 1310 are accessed within MSC 302 along a path separate from the main Short Message path. The path between THS 312 to MSC 302 is, for example, an SS7 or X.25 path. The main Short Message path, from THS 312 to SMSC 300 uses TCP/IP, X.25, SS7 or TCAP messages, as discussed previously.

THS 312 can also be fault tolerant. In the alternative, two THSs can be configured in an active standby configuration. Yet another alternative is to configure a plurality of THSs in an N+1 redundant load sharing configuration.

By adding additional THSs to an existing configuration, the traffic handling capability can be scaled up.

Those skilled in the art will appreciate that numerous changes and modifications could be made to the embodiment described herein without departing in any way from the invention. These changes and modifications and all obvious variations of the disclosed embodiment are intended to be embraced by the claims to the limits set by law.

We claim:

1. In a cellular telephone network having one or more signaling channels, wherein said signaling channels carry Short Messages, said network comprising:
   a plurality of terminal means for transmitting and receiving said Short Messages, and
   switching means for routing said Short Messages;
   an improved transaction handling system, comprising:
   means for receiving digitally encoded information from one or more sources;
   means for generating a unique identifier for said digitally encoded information;
   means for converting said digitally encoded information and said identifier into Short Messages compatible with said terminal means for transmission of said Short Messages on said cellular telephone network;
   means for extracting said digitally encoded information and said identifier from said Short Messages;
   means for interpreting said Short Messages to form a query for a destination; and
   means for directing said query to said destination.

2. An improved transaction handling system as described in claim 1 wherein said means for converting also comprises a means for encrypting said digitally encoded information and said means for extracting said digitally encoded information comprises a means for decrypting said digitally encoded information.

3. An improved transaction handling system as described in claim 1 wherein said means for interpreting said digitally encoded information comprises a means for fraud detection.

4. An improved transaction handling system as described in claim 1 wherein said digitally encoded information is magnetically encoded.

5. An improved transaction handling system as described in claim 1 wherein said digitally encoded information is read from a smart card.

6. An improved transaction handling system as described in claim 1 wherein said digitally encoded information is read from a bar code.

7. An improved transaction handling system as described in claim 1 wherein said digitally encoded information is obtained from a ground positioning system.

8. An improved transaction handling system as described in claim 1 wherein said digitally encoded information is obtained from an alarm system.

9. An improved transaction handling system as described in claim 1 wherein said digitally encoded information is obtained from a dispatching terminal.

10. A system as described in claim 9 wherein said dispatching terminal is a police dispatching terminal.

11. A system as described in claim 9 wherein said dispatching terminal is a fire truck dispatching terminal.

12. A system as described in claim 9 wherein said dispatching terminal is a medical emergency vehicle dispatching terminal.

13. A system as described in claim 9 wherein said dispatching terminal is a package delivery vehicle dispatching terminal.

14. A system as described in claim 9 wherein said dispatching terminal is a personal medical dispatching terminal.

15. An improved transaction handling system as described in claim 1 wherein said means for receiving said digitally encoded information activates said means for converting of said digitally encoded information for immediate transmission of said message after generation of said unique identifier.

16. An improved transaction handling system as described in claim 1 wherein said digitally encoded information is derived from a telemetry transmitter.

17. An improved transaction handling system as described in claim 16 wherein said telemetry transmitter is a watt-hour meter.

18. An improved transaction handling system as described in claim 16 wherein said telemetry transmitter is a water consumption meter.

19. An improved transaction handling system as described in claim 16 wherein said telemetry transmitter is a gas consumption meter.

20. An improved transaction handling system as described in claim 16 wherein said telemetry transmitter is a cable television service usage meter.

21. In a cellular telephone network having one or more signaling channels, wherein said signaling channels carry Short Messages, said network comprising:
   a plurality of terminal means for transmitting and receiving said Short Messages, and
   switching means for routing said Short Messages,
   an improved Transaction Handling System, comprising:
   means for receiving a query result from one or more sources;
   means for interpreting said query result into Short Messages having a structure compatible with said cellular telephone network;
   means for associating contents of said query results with a unique identifier, said identifier determinative of a network address for said Short Messages within said cellular telephone network;
   means for directing said Short Messages on said cellular network to said cellular network address.

22. An improved transaction handling system as described in claim 21 wherein said means for interpreting said message also comprises a means for encrypting said message.

23. An improved transaction handling system as described in claim 21 wherein said network address is a point of sale terminal means having a display.

24. An improved transaction handling system as described in claim 21 wherein said network address is a point of sale terminal having a printer.

25. An improved transaction handling system as described in claim 21 wherein said network address is a point of sale terminal means having message storage means.

26. An improved transaction handling system as described in claim 21 wherein said network address is a cable television interactive unit.

27. An improved transaction handling system as described in claim 21 wherein said network address is a cable television program request unit.

28. In a cellular telephone network having one or more signaling channels, wherein said signaling channels carry Short Messages, said network comprising:
   a plurality of terminal means for transmitting and receiving said Short Messages; and
   switching means for routing said Short Messages;
   an improved transaction handling system, comprising:
   means for receiving digitally encoded information from one or more sources;

means for generating a unique identifier for said digitally encoded information;

means for converting said digitally encoded information and said identifier into Short Messages compatible with said terminal means for transmission of said Short Messages on said cellular telephone network, said terminal means having an originating address;

means for interpreting said Short Messages to form a query for a destination using said digitally encoded information and said unique identifier;

means for storing an association of said unique identifier with said query;

means for directing said query to said destination;

means for interpreting a query result from said destination into reply Short Messages having a structure compatible with said cellular network;

means for using said association of said unique identifier with said query results to direct said reply Short Messages to said originating address within said cellular telephone network.

29. An improved transaction handling system as described in claim 28 wherein said means for converting also comprises a means for encrypting said digitally encoded information.

30. An improved transaction handling system as described in claim 28 wherein said means for interpreting said Short Messages comprises a means for fraud detection.

31. An improved transaction handling system as described in claim 28 wherein said transaction handling system is interfaced to said network using a TCAP interface.

32. An improved transaction handling system as described in claim 28 wherein said transaction handling system is interfaced to said network using a TCP/IP interface.

33. An improved transaction handling system as described in claim 28 wherein said transaction handling system is interfaced to said network using an agent terminal capable of two way cellular communications.

34. An improved transaction handling system as described in claim 28 wherein said transaction handling system is interfaced to said network by simulating a mobile switching center interface.

35. An improved transaction handling system as described in claim 28 wherein said transaction handling system is interfaced to said network using an X.25 interface.

36. An improved transaction handling system as described in claim 28 wherein said transaction handling system is interfaced to said network by using an SS#7 interface.

37. An improved transaction handling system as described in claim 28 wherein said transaction handling system is combined with a short message service center and a mobile switching center.

38. In a cellular telephone network having one or more signaling channels, wherein said signaling channels carry Short Messages, said network comprising:

a plurality of terminal means for transmitting and receiving said Short Messages; and switching means for routing said Short Messages;

an improved transaction handling system method, comprising the steps of:

receiving digitally encoded information from one or more sources;

generating a unique identifier for said digitally encoded information;

converting said digitally encoded information and said identifier into Short Messages compatible with said terminal means for transmission of said Short Messages on said cellular telephone network, said terminal means having an originating address;

interpreting said Short Messages to form a query for an destination using said digitally encoded information and said unique identifier;

storing an association of said unique identifier with said query;

directing said query to said destination;

interpreting a query result returned by said destination into reply Short Messages having a structure compatible with said cellular telephone network;

using said stored association of said unique identifier with said query result to direct said reply Short Messages to said originating address within said cellular telephone network.

39. An improved transaction handling system method as described in claim 38 wherein said converting step also comprises a step for encrypting said digitally encoded information and said extracting step for said digitally encoded information comprises a step for decrypting said digitally encoded information.

40. An improved transaction handling system method as described in claim 38 wherein said interpreting step for said digitally encoded information comprises a fraud detection step.

* * * * *